United States Patent
Roberts et al.

(10) Patent No.: US 7,522,536 B2
(45) Date of Patent: *Apr. 21, 2009

(54) METHOD FOR TRANSFERRING DATA OVER A NETWORK

(75) Inventors: Jeffrey S. Roberts, Kirkland, WA (US);
Stephen Scott Evans, Redmond, WA (US); Michael D. Zoran, Redmond, WA (US); Edward F. Reus, Woodenville, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

This patent is subject to a terminal disclaimer.

(21) Appl. No.: 10/987,881

(22) Filed: Nov. 12, 2004

(65) Prior Publication Data

US 2005/0068892 A1    Mar. 31, 2005

Related U.S. Application Data

(63) Continuation of application No. 09/783,407, filed on Feb. 14, 2001, now Pat. No. 6,920,110.

(51) Int. Cl.
*H04L 12/26* (2006.01)
*H04L 12/28* (2006.01)
*H04J 3/16* (2006.01)
*G06F 15/173* (2006.01)

(52) U.S. Cl. ................... 370/252; 370/401; 370/468; 709/224; 709/232

(58) Field of Classification Search .......... 370/230, 370/235, 236, 252, 253, 352, 401, 468; 709/217, 709/224, 232
See application file for complete search history.

(56) References Cited

U.S. PATENT DOCUMENTS

| 5,307,351 | A | 4/1994 | Webster |
| 5,432,781 | A | 7/1995 | Nimon |
| 5,434,848 | A | 7/1995 | Chimento, Jr. et al. |
| 5,465,331 | A | 11/1995 | Yang |
| 5,490,168 | A | 2/1996 | Phillips |
| 5,638,360 | A | 6/1997 | Sugawara |

(Continued)

FOREIGN PATENT DOCUMENTS

EP    0 782 302 A    7/1997

(Continued)

OTHER PUBLICATIONS

Floyd, S., et al., "Link-Sharing and Resource Management Models for Packet Networks," IEEE/ACM Transactions on Networking, pp. 365-386, vol. 3, No. 4, Aug. 1995.

(Continued)

*Primary Examiner*—Hong Cho
(74) *Attorney, Agent, or Firm*—Shook, Hardy & Bacon L.L.P.

(57) ABSTRACT

A method is provided for transferring a set of data over a network by monitoring the level of actual network bandwidth utilization. The method identifies a maximum monitored level of actual utilization and calculates a size for data blocks to be transferred as a function of the maximum monitored level of utilization. The data blocks represent a segment of a set of data, such as a software update that may be transferred or downloaded over the network without interfering with other network activity.

17 Claims, 6 Drawing Sheets

U.S. PATENT DOCUMENTS

| | | | | |
|---|---|---|---|---|
| 5,673,253 | A * | 9/1997 | Shaffer | 370/229 |
| 5,706,281 | A | 1/1998 | Hashimoto | |
| 5,708,779 | A | 1/1998 | Graziano | |
| 5,781,554 | A | 7/1998 | Organ | |
| 5,784,569 | A | 7/1998 | Miller | |
| 5,796,724 | A | 8/1998 | Rajamani | |
| 5,799,002 | A | 8/1998 | Krishnan | |
| 5,828,737 | A | 10/1998 | Sawyer | |
| 5,850,388 | A | 12/1998 | Anderson et al. | |
| 5,884,072 | A | 3/1999 | Rasmussen | |
| 5,898,673 | A | 4/1999 | Riggan et al. | |
| 5,913,040 | A | 6/1999 | Rakavy et al. | |
| 5,961,602 | A | 10/1999 | Thompson | |
| 5,995,488 | A | 11/1999 | Kalkunte | |
| 6,021,114 | A | 2/2000 | Shaffer et al. | |
| 6,075,772 | A | 6/2000 | Brown | |
| 6,078,591 | A | 6/2000 | Kalkunte | |
| 6,078,919 | A * | 6/2000 | Ginzburg et al. | 707/10 |
| 6,081,768 | A | 6/2000 | Hu | |
| 6,085,248 | A | 7/2000 | Sambamurthy | |
| 6,192,028 | B1 | 2/2001 | Simmons | |
| 6,209,033 | B1 | 3/2001 | Datta et al. | |
| 6,272,110 | B1 | 8/2001 | Tunnicliffe et al. | |
| 6,285,662 | B1 | 9/2001 | Wattanabe et al. | |
| 6,292,834 | B1 | 9/2001 | Ravi | |
| 6,327,677 | B1 | 12/2001 | Garg | |
| 6,353,616 | B1 | 3/2002 | Elwalid | |
| 6,427,169 | B1 | 7/2002 | Elzur | |
| 6,442,263 | B1 | 8/2002 | Beaton | |
| 6,463,468 | B1 | 10/2002 | Buch | |
| 6,516,348 | B1 | 2/2003 | MacFarlane | |
| 6,526,022 | B1 | 2/2003 | Chiu | |
| 6,636,486 | B1 * | 10/2003 | Magloughlin | 370/252 |
| 6,675,214 | B2 | 1/2004 | Stewart | |
| 6,701,316 | B1 * | 3/2004 | Li et al. | 707/10 |
| 6,704,873 | B1 | 3/2004 | Underwood | |
| 6,711,137 | B1 * | 3/2004 | Klassen et al. | 370/252 |
| 6,771,652 | B1 | 8/2004 | Aydemir | |
| 6,813,244 | B1 * | 11/2004 | He et al. | 370/235 |
| 6,816,456 | B1 * | 11/2004 | Tse-Au | 370/230.1 |
| 6,820,117 | B1 | 11/2004 | Johnson | |
| 6,823,385 | B2 | 11/2004 | McKinnon, III | |
| 6,836,800 | B1 | 12/2004 | Sweet | |
| 6,856,613 | B1 | 2/2005 | Murphy | |
| 6,920,110 | B2 | 7/2005 | Roberts | |
| 6,934,752 | B1 | 8/2005 | Gubbi | |
| 6,956,867 | B1 | 10/2005 | Suga | |
| 7,016,951 | B1 | 3/2006 | Longworth | |
| 7,028,182 | B1 | 4/2006 | Killcommons | |
| 7,089,290 | B2 | 8/2006 | Hennessey | |
| 7,092,355 | B1 | 8/2006 | Duong-Van | |
| 7,103,050 | B1 | 9/2006 | Luijten | |
| 7,116,639 | B1 | 10/2006 | Gail | |
| 7,139,815 | B2 | 11/2006 | Muti | |
| 7,325,068 | B2 | 1/2008 | Roberts | |
| 2001/0023454 | A1 | 9/2001 | Fitzgerald | |
| 2001/0055313 | A1 | 12/2001 | Yin | |
| 2002/0110149 | A1 | 8/2002 | Roberts | |
| 2005/0018611 | A1 | 1/2005 | Chan | |
| 2005/0068893 | A1 | 3/2005 | Roberts | |
| 2005/0086364 | A1 | 4/2005 | Muti | |
| 2005/0091397 | A1 | 4/2005 | Roberts | |
| 2005/0091398 | A1 | 4/2005 | Roberts | |

FOREIGN PATENT DOCUMENTS

| | | |
|---|---|---|
| EP | 0 862 304 A | 9/1998 |
| WO | WO 00/01123 | 1/2000 |

OTHER PUBLICATIONS

Alessandro Muti, U.S. Appl. No. 09/505,735, titled System & Method for Transferring Data Over a Network, filed Feb. 16, 2000.

* cited by examiner

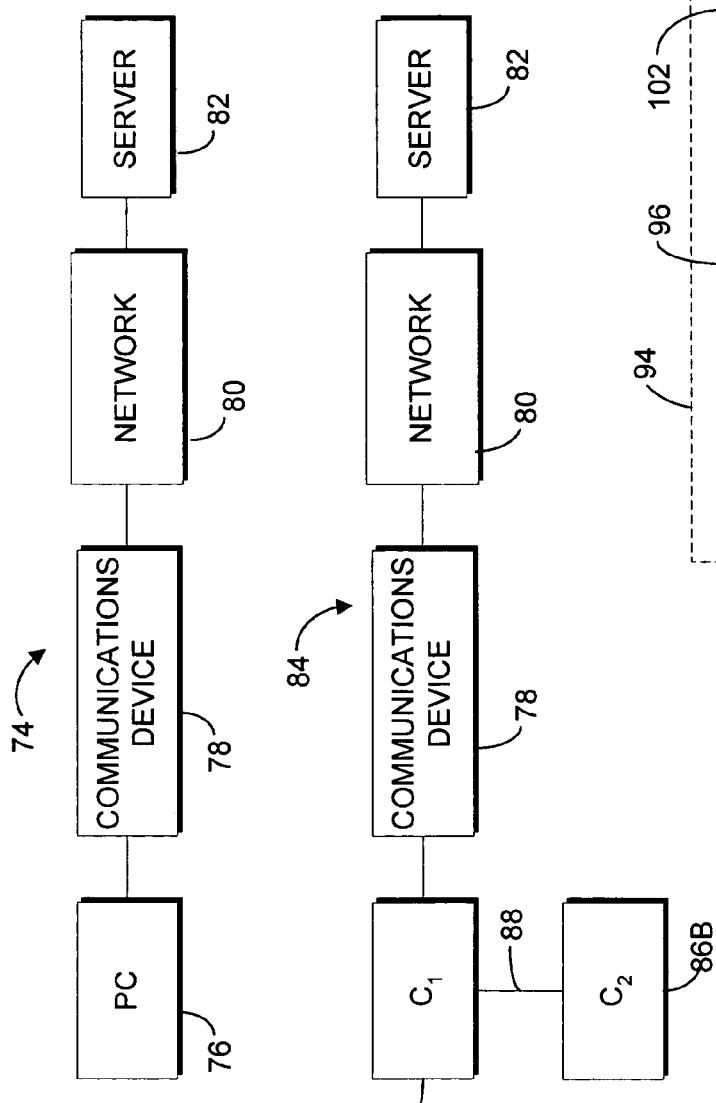
FIG. 2.
FIG. 3.
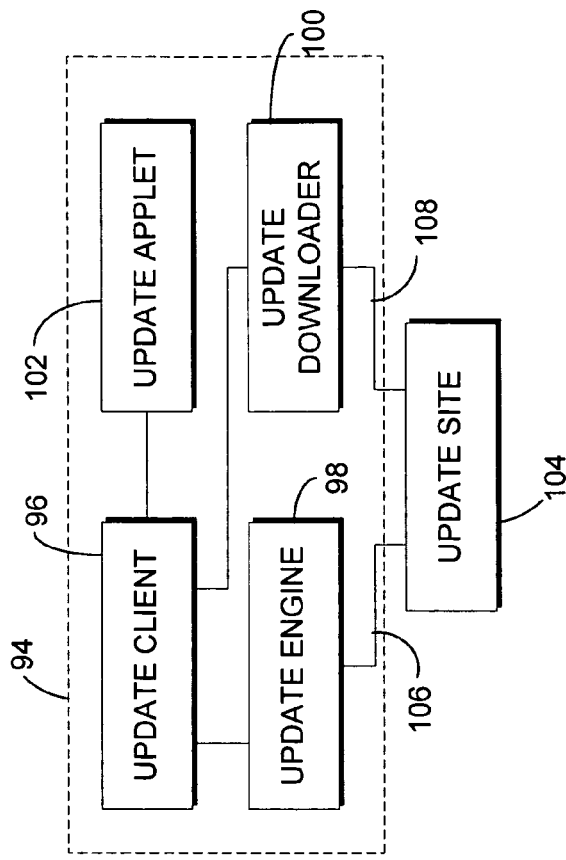
FIG. 5.
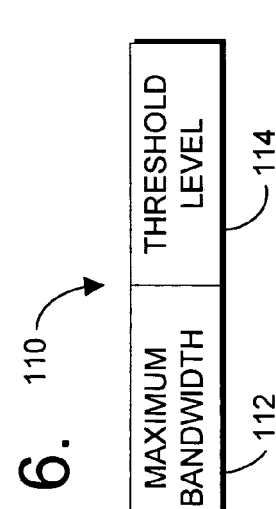
FIG. 6.

METHOD FOR TRANSFERRING DATA OVER A NETWORK

CROSS-REFERENCE TO RELATED APPLICATIONS

This application is a continuation of application Ser. No. 09/783,407, filed Feb. 14, 2001 which issued on Jul. 19, 2005 as U.S. Pat. No. 6,920,110.

STATEMENT REGARDING FEDERALLY SPONSORED RESEARCH OR DEVELOPMENT

Not applicable.

TECHNICAL FIELD

The present invention relates to computer software and, more particularly, to a system and method for transferring data over a network such as the Internet.

BACKGROUND OF THE INVENTION

A computer system in which one or more client machines communicate with one or more servers over a network is a common arrangement. For example, there are millions of personal computers (PCs) connected to the Internet for communication with various servers. Many of these PC users acquire new or updated software on their PCs by downloading the software from a remote server over the Internet.

Conventional methods of uploading and downloading data, such as new and updated software to a PC over a network such as the Internet interfere with the PC user's ability to browse the Internet or to otherwise communicate over the network during the download. With increased processing speeds for PCs, it is the bandwidth to the Internet which is becoming a significant bottleneck to the user's browsing experience. Because conventional downloads typically occupy 100% of the user's available communication bandwidth until the download is complete, the user is unable to utilize the network for other tasks during the download. Moreover, if the download is interrupted for some reason (e.g., the network connection is lost), it may be necessary to restart the download from the beginning of the file, thus wasting significant network resources. Other conventional downloading software permits the user to schedule the download for a designated time. In any event, conventional methods for downloading software over a network such as the Internet severely limit the user's ability to engage in other network activity.

Providing software updates is beneficial to PC users because it corrects problems and improves the performance of their PCs. Additionally, the software vendor benefits from a reduction in the number of product support calls, which in turn reduces the substantial resources the vendor might otherwise allocate to handling such calls.

Microsoft Corporation provides a software update service in connection with its MICROSOFT WINDOWS family of operating system products under the mark "WINDOWS UPDATE". By accessing the "WINDOWS UPDATE" Internet website, MICROSOFT WINDOWS users can have their system evaluated and download both critical and non-critical software updates (e.g., a fix or a patch) over the Internet. Upon determining there are updates available which are not already loaded on the user's PC, the user is notified that such updates are available, and the user is prompted to select one or more of them for downloading over the Internet. While this is a convenient method for providing software updates to users, such downloads could interfere with other network activity. Moreover, it is likely that many users will not take the initiative to navigate to the "WINDOWS UPDATE" website and download operating system updates for their PCs. Consequently, users who have not yet downloaded critical updates are more likely to encounter problems with their PCs, and they will likely call the vendor's product support line when a problem arises.

Accordingly, there is a need for an effective method for downloading software updates over a network so that interference with other network activity is minimized. One potential solution is simply to increase network bandwidth. However, increased bandwidth is expensive and has historically been followed by increased user demands. Thus, even as available bandwidth increases with technological advances, there will continue to be a need to eliminate interference with other network activity because of the corresponding increases in user demands.

BRIEF SUMMARY OF THE INVENTION

In one aspect, the invention is directed to a method of transferring a set of data over a network. The method includes the steps of monitoring the level of actual network bandwidth utilization and identifying a maximum monitored level of actual utilization. Then, the method calculates a block size of the data to be transferred as a function of the maximum monitored level of utilization. The block size portion of the data is then received.

Another aspect of the invention involves one or more computer-readable media having computer-usable components for managing the transfer of data over a network. The first component is a bandwidth monitoring component which monitors the level of actual bandwidth utilization for a network connection. The second component is a network speed calculating component, which calculates a network transfer speed as a function of the monitored level of utilization observed by the bandwidth monitoring component. The third component is a transfer management component, which manages the transfer of data over the network.

Yet another aspect of the invention is directed to a method of refining network utilization determination and data block size computations. The method includes obtaining a network utilization rate at intervals and determining an average of the network utilization rates. A block size of data to transfer during the intervals is computed as a function of the average.

BRIEF DESCRIPTION OF THE SEVERAL VIEWS OF THE DRAWING

The present invention is described in detail below with reference to the attached drawing figures, wherein:

FIG. 2 is a block diagram of a system including a client machine which communicates with a server over a network;

FIG. 3 is a block diagram similar to FIG. 2 but with first and second client machines connected to one another via an intranet;

FIG. 5 is a block diagram illustrating the architecture of a client machine in accordance with the present invention;

FIG. 6 is a block diagram of a data structure according to the present invention;

DETAILED DESCRIPTION OF THE INVENTION

The present invention provides a system and method for transferring data over a network such as the Internet.

Figure 1:
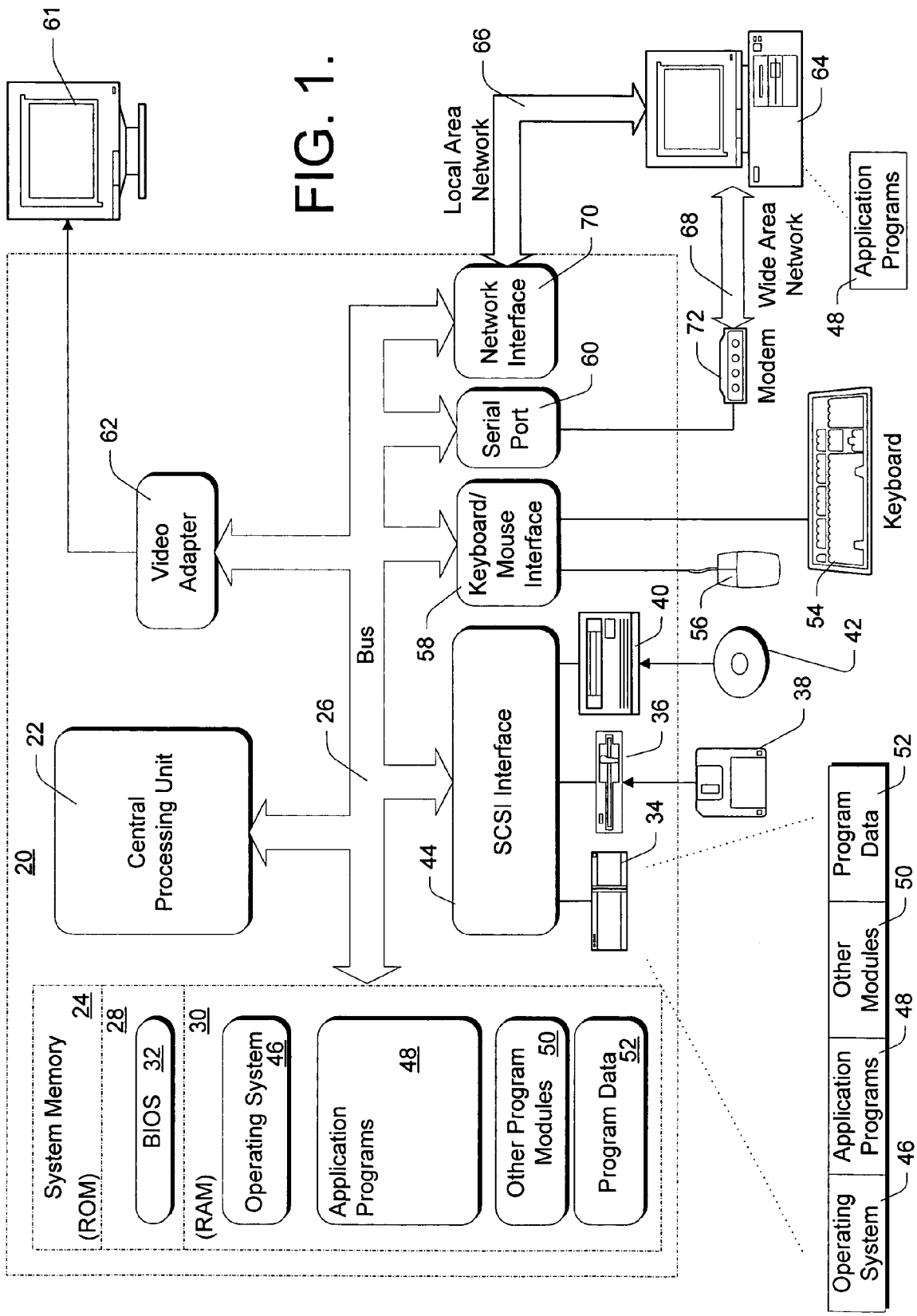
FIG. 1 is a block diagram of a suitable computing system environment for use in implementing the present invention.

FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 1 illustrates operating system 46, application programs 48, other program modules 50, and program data 52.

The computer 20 may also include other removable/non-removable, volatile/nonvolatile computer storage media. By way of example only, FIG. 1 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, non-volatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 1, provide storage of computer readable instructions, data structures, program modules and other data for the computer 20. In FIG. 1, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 1. The logical connections depicted in FIG. 1 include a local area network (LAN) 66 and a wide area network (WAN) 68, but may also include other networks. Such networking environments are commonplace in offices, enterprise-wide computer networks, intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 1 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

With reference to FIG. 2, an exemplary system for practicing the present invention is designated generally by reference numeral 74. The system 74 includes a client machine such as a PC 76 and a communications device 78 such as a modem for accessing a network 80 (e.g., the Internet). A server 82 is also connected to the network 80 in a conventional manner. The PC 76 and modem 78 establish a connection with the server 82 over the network 80 to facilitate the transfer of data between the client and the server.

A system 84 set forth in FIG. 3 is similar to the system 74 of FIG. 2, except that the system 84 includes a first client 86A and a second client 86B which are connected to one another over a link 88 such as an intranet. As with the system 74, the communications device 78 (e.g., a modem) establishes a connection between the first client 86A and the network 80. Accordingly, the clients 86A, 86B can exchange data with the server 82 over the network 80.

Those skilled in the art will readily appreciate that the present invention encompasses many possible variations to the systems 74, 84 shown in FIGS. 2 and 3. Of course, any number of client and server machines may be connected to the network 80 (either directly or indirectly). For example, the system 84 could include more than two client machines, one of which would act as a proxy for the others. In that case, the client machines could be connected to one another over an intranet, and the network card in the proxy machine could be connected to a router which is linked to the network 80 over a T1 line. Moreover, the network 80 could be the Internet or any other public or private network. Additionally, the communications device 78 may be part of the PC 76 or an independent hardware device.

Figure 4:
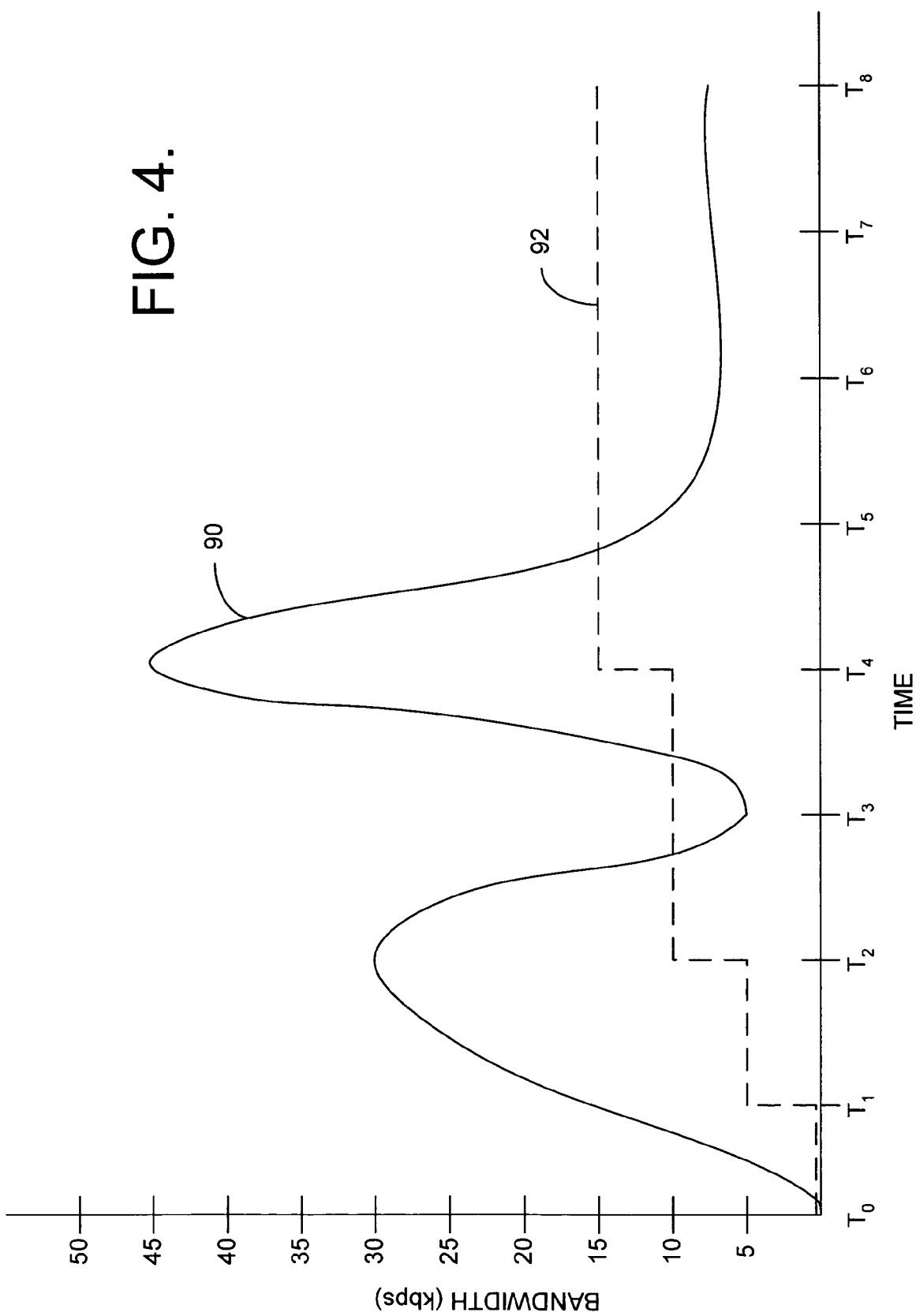
FIG. 4 is a diagram illustrating network bandwidth utilization over time with a curve representing the actual network bandwidth utilization and a broken line representing a threshold level of utilization calculated in accordance with the present invention.

In one application of the present invention, the client machine is the PC 76, the device 78 is a 56 Kbps (Kilobits per second) modem, the network 80 is the Internet, and the server 82 is a website accessible over the Internet for downloading software updates for the operating system of the PC. Referring to FIG. 4, a curve 90 represents the level of actual network bandwidth utilization for a client PC accessing the Internet over a period of time. The curve 90 rises from $T_0$ through $T_2$ to reflect the flurry of network activity which typically occurs as the user initially accesses the Internet. Then, after a brief decrease in network activity at $T_3$, the client's actual utilization again rises dramatically to a peak at $T_4$. This peak could represent any number of possible actions initiated by the client, such as the downloading of a webpage or the opening of an email message. While the user at the client machine reads the web page or the email message, or perhaps listens to music over the Internet, the actual network utilization decreases to a significantly lower level from $T_5$ through $T_8$.

The relatively low level of actual network bandwidth utilization shown from $T_5$ through $T_8$ (FIG. 4) is sometimes referred to as "network idle." This concept differs from "machine idle," which occurs when a PC user is not currently using the keyboard or mouse. If the machine remains idle for a period of time, a screen saver may be invoked. However, network utilization may be high at the same time the machine is idle (e.g., during a download), and the network interface may be "idle" when the machine is not. Thus, the present invention is directed to the transfer of a set of data, such as a software update, over a network at a time when the network utilization is relatively low. This transfer of data is intended to be transparent to the user, and the user's machine need not be idle during the transfer. This transfer of data could just as easily relate to activities initiated by a user action on the PC, such as playing video games or downloading music MP3 files, eBooks and so on. Moreover, the data to be transferred may include text, image and/or audio data. The present invention is also equally applicable to uploads from the client to the server or other communication of data between computers.

As described below in connection with FIG. 7, the present invention monitors the level of actual utilization represented by the curve 90 (FIG. 4) and calculates a threshold level of utilization below which the transfer of data between the client and server is not likely to interfere with other network activity. In a preferred embodiment, the threshold level is equal to approximately 33% of the maximum detected level of actual network utilization. As shown in FIG. 4, the threshold level is generally designated by reference numeral 92 and is initially set to zero. Network activity is periodically sampled, and a new threshold level is calculated each time a new maximum is identified. At $T_1$, the level of actual bandwidth usage is 15 Kbps, which is a new maximum, so the threshold 92 is set to 5 Kbps. The level of actual bandwidth usage is again sampled at $T_2$, and another new maximum of 30 Kbps is identified. Consequently, the new threshold 92 is calculated to be 10 Kbps.

When the level of actual usage 90 drops below the threshold level 92, as at $T_3$, a brief transfer of data should not significantly interfere with other network activity. The transfer of data could be initiated immediately upon first detecting that the actual usage is below the threshold level. However, a more conservative approach, in that it is more deferential to the user, is to detect at least two consecutive occurrences of low usage before initiating a download. In any event, a new maximum of 45 Kbps is detected at $T_4$, thereby triggering the calculation of an updated threshold level of 15 Kbps. Consequently, if any data transfer were initiated at $T_3$, then it would be immediately suspended at $T_4$. At $T_5$, the actual usage 90 once again drops below the threshold level 92. This time, the level of actual usage 90 remains between 5-10 Kbps, which is less than the threshold level of 15 Kbps, from $T_5$ to $T_8$. Thus, the transfer of data over the network would not interfere with other network activity during this time period.

A preferred architecture of the client of the present invention is set forth in FIG. 5. A client 94 includes an update client 96, an update engine 98, an update downloader 100 and an update applet 102. The client 94 is connected to a server such as via an update website 104 over a pair of links 106, 108, which are preferably HTTP (Hypertext Transfer Protocol) links. The update client 96 is responsible for notifications and personalization options for the user. The update engine 98 controls content interaction with the update site 104 as well as detection, installation and logging of software updates. The update downloader 100 is responsible for implementing the packet background downloading/throttling and incoming packet queue management. The update applet 102 determines the configuration of update notifications to the user and other interactions with the user. The backend content and catalogs are available from the update site 104.

The present invention utilizes a data structure 110 illustrated in FIG. 6. The data structure 110 includes a first field 112 which contains the maximum identified level of actual bandwidth utilization and a second field 114 which contains the threshold level of utilization. As shown in FIG. 4, both the maximum identified level and the threshold level can vary over time depending on the level of actual utilization. As mentioned above, the threshold level is calculated as a function of the maximum identified level of actual usage. Therefore, a new threshold level is calculated each time a new maximum level is detected.

Figure 7:
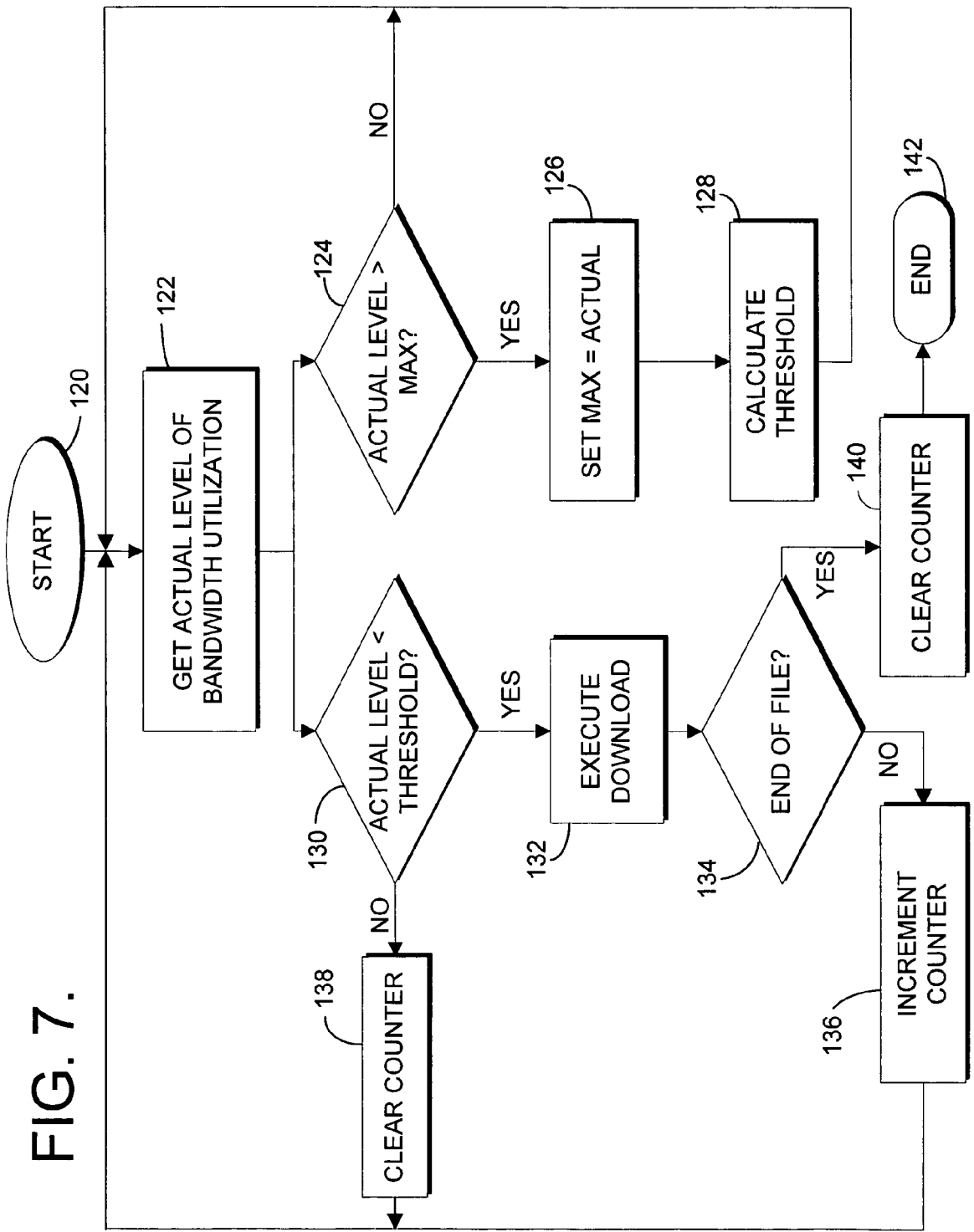
FIG. 7 is a flowchart representative of a computer program for transferring data over a network in accordance with the present invention.

FIG. 7 sets forth a flowchart representative of a computer program for selectively transferring data over a network in accordance with a preferred embodiment of the present invention. The program is started at step 120 when certain predetermined conditions are present. Typically, the client PC should be turned "on" and connected to the network before starting the program. While it would be possible for the program to establish the connection between the PC and the network, some PC users may be startled by the unexpected sound of their modem dialing up the network on its own. It is also possible that the client may be connected to another network (e.g., a private network) so that access to a webserver is not possible until the client disconnects from the private network and reconnects to the Internet. It can be confirmed that the client and server are connected to the same network by "pinging" the server and receiving an acknowledgment from the server. Those skilled in the art can readily determine which preliminary conditions would be appropriate in a given situation.

Once the client is connected to the same network as the server, the level of actual network bandwidth utilization is obtained at step 122. As shown in FIG. 4, the actual usage is sampled periodically (e.g., every five seconds). Preferably, this is done by tracking the number of incoming and outgoing packets over a given time period (e.g., one second) at the communications interface between the client and the network. For a PC running the "WINDOWS 98" operating system, this information is available using the GetIfEntry function in "iphlpapi.dll".

Relatively large files provide a more accurate basis for measuring the level of actual network bandwidth usage at the network interface. For example, it is difficult to accurately measure the download time for a 200 byte file because the overhead of measurement is significant and the small file does not saturate the available bandwidth. Consequently, the present invention preferably updates the maximum level of utilization only when the measurement of the actual level of utilization is based on the transfer speed of a file that is at least 4 KB in size.

Preferably, each of the "virtual devices" is enumerated to ensure accurate monitoring, especially in a system which is more complex than the system 74. The term "virtual device," as used herein, refers to any networking device with a device driver, such as modems (including cable modems and ISDN modems), network cards and DSLs (Digital Subscriber Lines). Each channel of a 2-channel ISDN modem is considered to be a separate virtual device for the purposes of the present invention.

Importantly, the level of actual network bandwidth utilization is monitored rather than simply relying on the rated or listed throughput of the network device. The rated value is not reliable because, as a practical matter, the maximum throughput achieved by a modem is less than its listed throughput and may be different for each network session. Variables such as the quality of the telephone connection typically result in a maximum available bandwidth of less than 50 Kbps for a 56 Kbps modem.

Moreover, rated values cannot be assumed to be accurate when a client is connected to the network by a proxy. In the system 84, there is a peer-to-peer connection between the first client 86A and the second client 86B over the intranet 88, and the first client 86A is in turn linked to the network 80 by a modem 78. Assuming a 56 Kbps modem and a 10 Mbps intranet, the modem 78 is the bottleneck to the network 80. Thus, if the first client 86A were utilizing 40 Kbps of the network bandwidth at the same time the second client 86B is utilizing only 5 Kbps of the bandwidth, there would not be sufficient network bandwidth available to download a set of data (e.g., a software update) from the server 82 to either client without degrading their other network activity. Moreover, it would not be accurate to assume either that the second client 86B has a maximum throughput of 10 Mbps or that substantial bandwidth is available because the second client 86B is only using 5 Kbps of the network interface. Here, in the case of remote access, the level of actual bandwidth utilization for the second client 86B can be obtained from the RAS (Remote Access Service) device table. Thus, monitoring the actual throughput at each virtual device advantageously adapts to configuration changes between sessions and is therefore a more reliable approach.

Referring again to FIG. 7, the maximum detected level of actual usage is initially set to zero. Then, at step 124, it is determined whether the actual usage is greater than the current maximum. If not, the actual usage is sampled again at step 122. However, if the actual usage is greater than the current maximum, then a new maximum is set equal to the current actual level at step 126. Next, a threshold level is calculated as a function of the maximum at step 128. The threshold is initially set to zero, and a new threshold is calculated each time a new maximum is detected. As a general proposition, the threshold level could be anywhere from approximately 5%-80% of the maximum detected level. However, the presently preferred threshold level for Internet applications is approximately 33% of the maximum detected level. Once the new threshold level has been calculated, the actual usage is sampled again at step 122.

It should be noted that the present invention calculates the threshold level as a percentage of actual network bandwidth in Kilobits per second, as opposed to some other parameter, such as the percentage of time the network connection is busy over a given period. For example, a client machine utilizing its network connection 75% of the time over the course of an hour is not necessarily using 75% of its available bandwidth. In fact, if the user at the client PC is merely reading a webpage, reading email, listening to music or the like, it is likely that the level of actual bandwidth utilization is well below the maximum available bandwidth. Those skilled in the art will understand that the present invention, which is implemented at the client level, is fundamentally different from methods for limiting bandwidth at the hardware level (e.g., sockets).

Each time the level of actual network bandwidth utilization is obtained at step 122, it is also compared to the current threshold level. At step 130, it is determined whether the actual usage is less than the threshold level. If so, a software update (or other set of data) available from the server can be downloaded over the network to the client. To minimize interference with any other present or future network activity of the client, the download is preferably performed by downloading the software update in several segments. Accordingly, at step 132, one segment of the file is downloaded from the server to the client. If the client's network activity increases after downloading the first segment, the download of the entire file can be suspended until the actual usage drops back down below the threshold level. However, if the network is idle for an extended period of time, the download can be accelerated by downloading progressively larger segments of the file over the network.

A counting device is provided in a preferred embodiment of the present invention to facilitate the downloading of progressively larger file segments. For example, a 144 KB file may be downloaded from the server to the client over the Internet by first transferring an 8 KB segment of the file at step 132 of FIG. 7. A small segment such as 8 KB has been found to be an effective default because it uses 100% of the pipeline for a short period of time and permits frequent monitoring of actual usage between segments. Even if a user clicks on an URL (Uniform Resource Locator) during the download of an 8 KB block, there will be no noticeable delay to the user. Moreover, in the event an interruption occurs, 8 KB is the most data that can be lost.

At step 134, it is determined whether the entire file has been downloaded. Since the 8 KB block was the first segment of the 144 KB file, the entire file has not been downloaded and the counter, which is initially set to zero, is incremented to "1" at step 136. The counter keeps track of the number of segments that have been downloaded consecutively without interruption so that the size of the segments can be increased so long as network activity remains low. As an example, the size of the segments could be increased to 16 KB if the counter is equal to "2", and the size of the segments could be increased to 32 KB if the counter is equal to "4". This would enable the 144 KB file to be downloaded in seven progressively larger segments as opposed to 18 of the smaller 8 KB segments, provided network activity stays below the threshold level. Although the larger segments take longer to download and therefore result in less frequent monitoring of the actual usage, this approach takes advantage of any extended periods of low network activity. Typically a header accompanies each segment, so transferring a smaller number of larger segments also reduces network overhead by reducing the total number of headers transferred over the network. Presently, a 64 KB segment is the largest segment that is preferred when using a 56 Kbps modem.

After incrementing the counter at step 136, steps 122 and 130 are repeated. If the level of actual usage is no longer less than the threshold level, the file download is suspended and the counter is cleared (i.e., set to zero) at step 138. Then, the actual utilization is sampled again at step 122. In the event the download is suspended, the download will be resumed from the point of suspension. However, if the actual usage remains below the threshold level, the next segment is downloaded at step 132, and the process is repeated until it is determined at step 134 that the entire file has been downloaded. If so, the counter is cleared at step 140 and the loop ends at step 142.

It should be noted that the progressive download feature of the present invention may require filtering or a similar technique to overcome the limitations of some existing servers. While progressive downloads have been widely available at the FTP (file transfer protocol) level, they were not available at the HTTP level until HTTP 1.1 servers became available. As discussed above, the present invention utilizes a byte range approach with 8 KB file segments as a default. For the first segment, a byte range of "0-7999" is specified in the download request from the client, the range "8000-15999" is specified in the download request for the second segment, and so on. However, the byte range portion of the request would be lost if an HTTP 1.0 server is encountered, and the entire file would be downloaded at once. One way to avoid this problem is to use an ISAPI (Internet Server Application Programming Interface) filter to simulate an HTTP 1.1 byte request across an HTTP 1.0 proxy. Then, even if an HTTP 1.0 server is encountered, the byte range information will not be lost.

Of course, the preferred size of the segment or byte range can vary dramatically based on factors such as the speed of the modem. The foregoing examples (e.g., the default segment size of 8 KB) are based on the assumption that a large number of users will access the network with 56 Kbps modems. However, it may be appropriate to assume that a large number of users will access the network with 28 Kbps modems. In that case, the preferred default segment size would be 4 KB rather than 8 KB. Likewise, the progressively larger segments would be 8 KB and 16 KB rather than 16 KB and 32 KB.

Those skilled in the art will appreciate that the use of a variety of other segment sizes is also contemplated by the present invention.

In another embodiment of the present invention, the monitoring of actual bandwidth usage during an extensive download may be given more weight than the monitoring of actual bandwidth usage before or after such a download. That is, if a predetermined number of segments are downloaded consecutively, the average level of usage for each of the segments is adopted as the new "maximum" level. For example, if the predetermined number of segments is 10, the average level of usage during the downloading of ten consecutive segments would replace the previous maximum level even if the average level is less than the previous maximum value. Moreover, if 11 segments are consecutively downloaded, the average level would be calculated for segments 2-11 so that a moving average of 10 downloads determines both a new maximum level and a new threshold level.

Using a moving average to identify the maximum level advantageously provides a dynamic increase or decrease to the threshold level in response to changing network traffic conditions without compromising the accuracy of the measurement. Preferably, the maximum level will remain frozen at the most recent moving average (of the predetermined number of segments) until another extensive download occurs. In other words, a maximum level based on an extensive download is deemed to be a more accurate reflection of available bandwidth than the initial maximum level measured prior to a download. Likewise, the download of an isolated segment may not provide an accurate reflection of available bandwidth. To keep track of the number of consecutive downloads for the moving average, a counter such as the one referenced in FIG. 7 may be used.

Another embodiment of the present invention is described below in conjunction with FIGS. 8-10. With reference to FIG. 10, the further embodiment of the present invention monitors the level of actual network utilization represented by the curve 804 (FIG. 8) and calculates the size of a block of data that can be transferred within a predetermined interval ($T_{n-1}$-$T_n$) (FIG. 8) such that transfer of data between the client and server is not likely to interfere with other network activity. A block represents a portion of an entire set of data that is to be transferred or other independent useful unit of data. This further embodiment more fully utilizes the available bandwidth of a Network by computing block sizes and refining network speed estimates, as opposed to an embodiment as described above that utilizes a fixed threshold value to determine when to transfer data.

Figure 8:
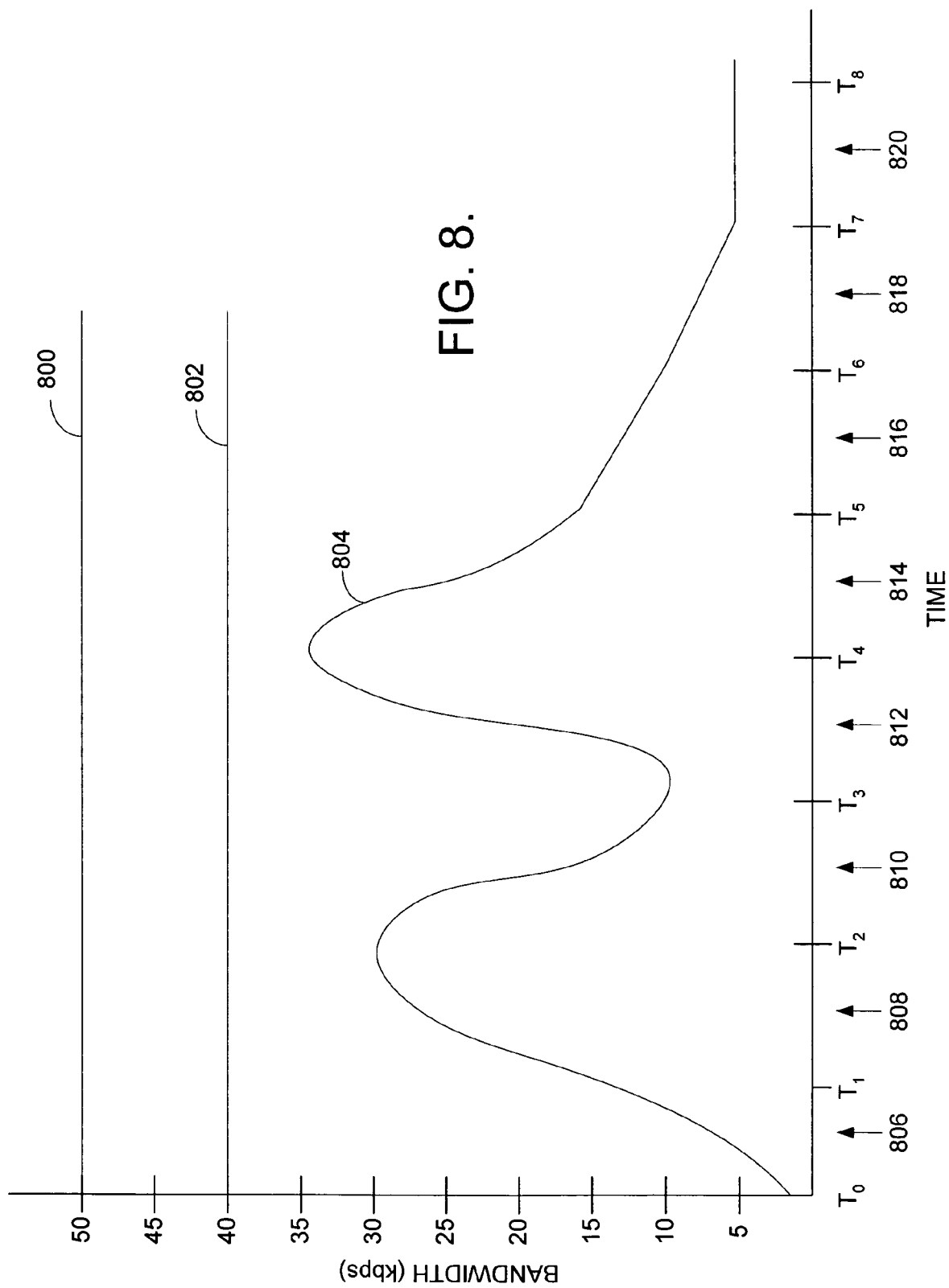
FIG. 8 is a diagram illustrating network bandwidth utilization over time with a solid curve representing the actual network bandwidth utilization and broken line curve representing the observed transfer rate between client and server, and the data flow rate through the network in accordance with a further embodiment of the present invention.

In practice and by way of example and not limitation, FIG. 8 illustrates some concepts from the further embodiment of this invention. As shown in FIG. 8, the sampling time is generally designated by $T_n$ and the interval $T_{n-n}$-$T_n$ is initially set to a value such as 1 second. In FIG. 8, the region (Area 1) under the external usage curve 804 between the intervals $T_1$ and $T_2$ (808) would represent the total number of bytes that were transferred by processes other than the current invention. The region (Area 2) bounded by the observed network throughput 802, the external usage curve 804, and the intervals $T_1$ and T2 (808), represent the amount of bytes that could potentially be assigned for a block size. As shown, the Network throughput 802 and external usage 804 fluctuate over time, thereby necessitating the re-computation of block sizes in order to fully utilize the available bandwidth. Network activity is sampled at various points during each interval. The sampling interval is then adjusted in response to the determined network speed and utilization, rather than being maintained at a fixed value in contrast to the embodiment of FIGS. 4-7. This reduces CPU and network overhead that arises from using block sizes that are not optimized for the Network.

This embodiment includes three components. There is a network interface component that collects data about the number of bytes sent and received through the Network interface hardware. There is a network speed calculator component that determines Global speed, Download speed and Free bandwidth. Finally, there is the Data Block Download component that uses the values computed by the speed component to compute a block size and download interval size.

The algorithms used by this further embodiment are detailed below. Here again, it should be noted that the references within the following algorithms are exemplary, since this algorithm is equally applicable to the upload of data.

The embodiment divides each time interval into two phases, a download phase and an idle phase. During the download phase, the software downloads a block of data from the server. During the idle phase, the software relinquishes the network to other applications.

The network-monitor component of the embodiment has access to a counter that records the number of bytes that have passed through the network interface at a given moment. The difference between two readings of the counter indicates the number of bytes that have been transferred in the time between the two readings.

During each time interval ($T_{n-n}$-$T_n$), the network-monitor component samples the system clock and bytes-transferred counter at three points: (1) the start of the interval, which is also the start of the download phase, (2) the end of the download phase, and (3) the end of the interval. The download component records the interval length, the size of the block to be downloaded, and the expected duration of the download phase. At the end of the interval, the network-speed component updates its speed estimates as follows:

1. If a block was downloaded during the interval, the download rate is calculated:

last-rate=(block size+network header size)/(time at point 2−time at point 1)

and the average download rate is updated. The current embodiment uses the formula new-download-rate=old-download-rate*(sample-count−1)/sample-count;   1 new-download-rate=new-download-rate+(last-rate/sample-count);   2 with sample-count set to 3 however, many other averaging formulae could be used instead. This is also true of the other average values that the downloader calculates. The average download rate will enable the block-download component to choose a block size that can be completed during the download phase of the next interval.

2. The component measures network utilization during the download phase to arrive at global-speed:

Bytes-transferred=(bytes at point 2−bytes at point 1)

Download-phase-length=(time at point 2−time at point 1)

last-global-speed=bytes-transferred/download-phase-length

If this is the first interval since the start of the downloader, the global-speed is set to last-global-speed.
   Otherwise,
      if last-global-speed<global-speed/2
      then global-speed=(global-speed*0.9).

Last-global-speed is averaged into global-speed by the same algorithm used for the average download rate. Global-speed is used as an estimate of the total throughput of the network interface.

3. Measure the network utilization over the whole interval, calculate the portion that is from sources external to the downloader, and calculate percent-free:

Bytes-transferred=(bytes at point 3–bytes at point 1)–(block size+overhead)

Actual-interval-length=(time at point 3–time at point 1)

External-utilization=bytes-transferred/actual-interval-length

Percent-free=100*(1–external-utilization/global-speed)

The block-downloader component uses Percent-free to choose the relative length of the download phase and idle phase of the following download interval. The further embodiment limits percent-free to 80% as insurance against an increase in external activity, other similar policies are also possible.

The further embodiment adjusts the duration of the sampling interval depending upon the network speed and utilization, rather than using a fixed value as in FIGS. 1-7. This reduces CPU and network overhead that arises from using block sizes that are not optimized for the Network. For instance, in many implementations, using a very large block size would require dedicating a prohibitive amount of memory as a buffer. Conversely, sending data as a series of very small blocks may waste resources by requiring extra network header fields and network protocol acknowledgements. Deriving block sizes that take full advantage of Network bandwidth and that minimize the interference to Network traffic is an advantage of this further embodiment. There are several steps and components involved in determining appropriate block sizes.

For the purpose of further illustration and with reference to FIG. 8, assume that the upper bound for a block size, which is dictated by the memory of the downloader, is 30 Kb, i.e. the downloader can hold 30 Kb of data before it needs to write to a disk. Assume further that that the default interval duration is one second and the computed block size for interval $T_5$-$T_6$ is 35 Kb, which is beyond the maximum. As such, the algorithms of the present invention will shrink the durations of the next interval intervals $T_6$-$T_7$ in order to reduce the block size below the maximum. Continuing with this illustration, if the interval $T_6$-$T_7$ were reduced to 0.8 seconds for example, it will result in a computed block size of 28 Kb, which is within the bounds for a block size. Thus the next interval $T_7$-$T_8$ (820) will also be set at 0.8 seconds instead of 1 second. Those skilled in the art will appreciate that the use of a variety of interval values and other block size boundaries are also contemplated by the present invention. Conversely, a block size is considered to be too small when the computed size falls below a default lower boundary which has been determined to be an inefficient size of data to transfer in the given interval. In this case, the downloader may choose to download the minimum size and then download nothing for one or more intervals, or it may choose to increase the interval length.

Several conservative approaches are taken in this further embodiment to support an acceptable level of system responsiveness while more fully utilizing available network bandwidth. Those skilled in the art will appreciate that any number of more or less conservative approaches could be used and are contemplated by the present invention. More specifically, a smoothing of the sampled network data is achieved by using an average for the Global Speed and Download Speed wherein, the average is weighted in favor of the most recent sample. In computing the running average, the latest sample counts for 30% of the new total, with the previous value counting for 70%. While this particular method of diluting the latest value with previous averages is used, other implementations would achieve the same result of allowing recovery from spikes in network activity. For example, keeping the last 10 samples and then re-computing an average using all the saved samples and the newly obtained sample each time would achieve the same result. Another approach that is taken involves a global rate that is determined to be less than one half of the average usage rate. In this case, it is assumed that the reduction is a result of client inactivity rather than a sudden loss of bandwidth. Thus, the newly determined Global speed value is not introduced into the average because that would unduly reduce the bandwidth average. However, the Global speed average is slightly reduced by a value such as 10%, in case the bandwidth really has changed. An example of such a bandwidth change would be if the telephone line noise suddenly increased due to a thunderstorm in the area. Yet another conservative approach that is taken involves limiting the Percent-free to a value such as 80%, in order to leave a little cushion for other applications.

Figure 9:
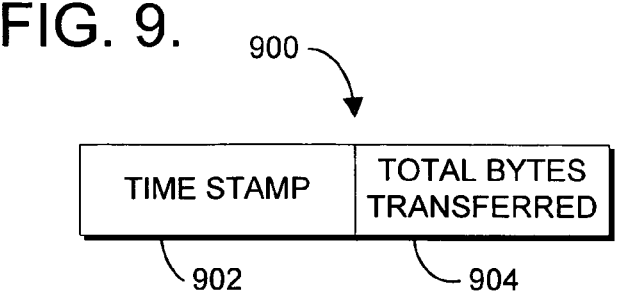
FIG. 9 is a block diagram of a data structure according to the further embodiment of the present invention.
Figure 10:
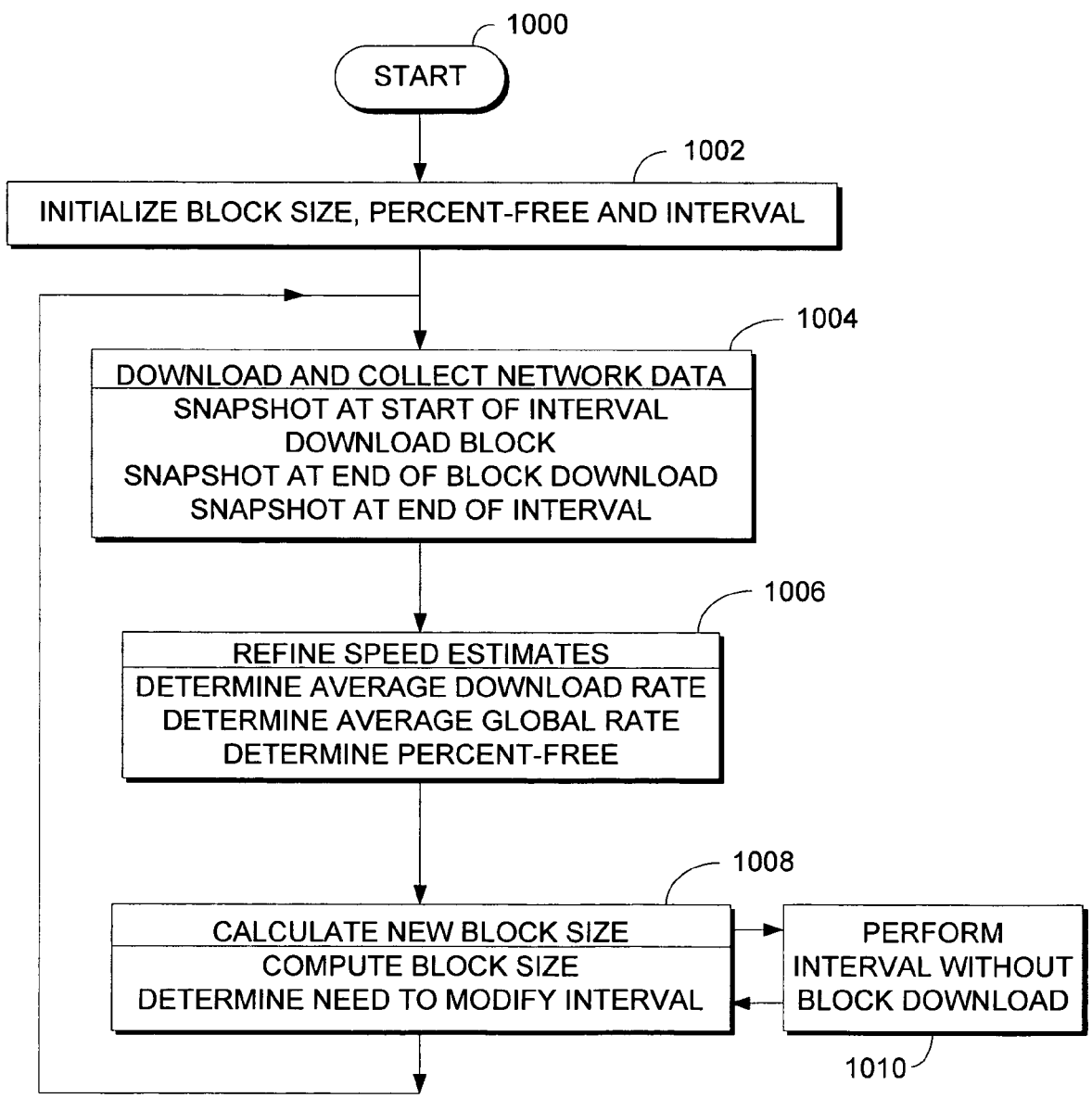
FIG. 10 is a flowchart representative of a computer program for transferring data over a network in accordance with the further embodiment of the present invention.

The further embodiment of the present invention utilizes a data structure 900 illustrated in FIG. 9. The data structure 900 includes a first field 912 which contains the time at which the identified level of actual bandwidth utilization was taken and a second field 914 which contains the total number of bytes through the network interface, a monotonically increasing counter of the bytes that have been sent or received by the adapter. As shown in FIG. 8, both the timestamp and the bytes count vary with each sampling, depending on the level of actual utilization 802. By subtracting consecutive measurements of these values, an interval period and number of bytes transferred during the interval period are obtained.

FIG. 10 sets forth a flowchart representative of a computer program for selectively transferring data over a network in accordance with the further embodiment of the present invention. The program is started at step 1000 when certain predetermined conditions are present. Once the client is connected to the same network as the server, the block size, Percent-free, and sampling interval are initialized to default values at step 1002. As shown in FIG. 8, the actual usage is sampled periodically (e.g., every second). Preferably, as discussed above, this is done by tracking the number of incoming and outgoing bytes at important moments of the interval sample period (e.g., Start of interval, end of block transfer and end of interval) at the communications interface between the client and the network.

Referring again to FIG. 10, based on the initialized values for block size, Percent-free and interval, a block download and network data collection take place at step 1004. Then, at step 1006, the network speed related elements namely Download speed, Global speed and Percent-free are refined and updated accordingly. Next, a block size is calculated as a function of the network speed related elements at step 1008. A new block size is calculated each time after a block download. As a general proposition, the block size could be anywhere between the size of communications packet header and the size of the memory allocated for the downloader. The presently preferred minimum block size for Internet applications is approximately 1000 bytes, 500 for block data and 500 for HTTP request and reply packet headers. Once the size has been calculated, the actual usage is sampled again at step 1004.

At step 1006, an average of download speed and Global speed are computed, along with the network Percent-free value. As previously discussed with reference to FIG. 8, during this process, it is determined whether the observed Global speed is within an acceptable range of the average Global speed, and whether Percent-free is less than a predetermined maximum fraction of bandwidth value. In the further embodiment of this invention, the observed Global speed must be greater than one half of the average Global speed in order to be included in the computation of a new average Global speed. Otherwise, the new average is determined to be 90% of the previous average Global speed. With regards to Percent-free, the further embodiment of this invention may require that a computed Percent-free value can be no greater than 80%.

Software updates (or other set of data) available from the server can be downloaded over the network to the client. As discussed above, to minimize interference with any other present or future network activity of the client, the download is preferably performed by downloading the software update in several segments otherwise referred to as a block. Accordingly, at step 1004, one segment of the file is downloaded from the server to the client. If the client's network activity increases after downloading the first segment, the further embodiment will download smaller blocks unless the block size drops below the previously discussed minimum. However, if the network becomes idle, the next iteration of step 1006 will increase the block size appropriately.

At step 1008, the computed block size is bounded to a lower and upper value. The lower boundary is a size so small that it is more efficient to do nothing in that particular interval. If a computed block size is below this boundary during two consecutive intervals, the size of the interval is incremented and no block is downloaded during this second interval, as shown at step 1010. If the computed block size remains below the lower boundary during the newly incremented interval, the block size is set to a "Busy-block-size" and the interval is set to a default interval value. Busy-block-size is a value that allows a minimal download to occur such that, 1) some progress is made in the download process, 2) the invention is able to address a situation wherein a server is so slow that the calculated block size may never rise to the downloader minimum, and 3) the process of downloading allows the refinement of estimated network speeds. A block size that exceeds the maximum boundary results in a shrinking of the interval so that the computed block size can be kept within bounds.

The present invention has been described in connection with exemplary embodiments which are intended to be illustrative rather than restrictive. For example, the invention has been described in the context of downloading software updates for the operating system of the PC. The software updates could just as easily relate to many other types of software, such as updates to video games on the PC. Moreover, the data to be downloaded may include text, image and/or audio data. The present invention is also equally applicable to uploads from the client to the server.

Alternative embodiments of the present invention will become apparent to those skilled in the art to which it pertains upon review of the specification, including the drawing figures. Accordingly, the scope of the present invention is defined by the appended claims rather than the foregoing description.

What is claimed is:

1. A computer-implemented method of transferring a set of data over a network, the method comprising:
    monitoring the level of actual network bandwidth utilization of a communications device by periodically sampling, at the communications device, an amount of incoming and outgoing data transferred over a given time period;
    calculating network speed related elements as a function of the monitored level of actual network bandwidth utilization, the network speed related elements including a download rate, a global speed, and a percent-free;
    calculating a block size to transfer as a function of the network speed related elements; and
    facilitation transfer of said block size portion of the set of data over the network at one or more intervals.

2. The method of claim 1, wherein a client receives the data over the network from a server.

3. The method of claim 2, wherein said monitoring occurs at the interface between the client and the network.

4. The method of claim 1, wherein the network is the Internet.

5. The method of claim 1, wherein the set of data includes a software update.

6. The method of claim 1, further comprising repeating at least said monitoring each time a portion of the set of data is received.

7. The method of claim 1, further comprising repeating at least said calculating the network speed related elements each time a portion of the set of data is received.

8. The method of claim 1, wherein a client sends the data over the network to a server.

9. One or more computer-storage media storing computer-usable components for managing the transfer of data over a network, comprising:
    a bandwidth monitoring component which monitors the level of actual bandwidth utilization of a communications device by periodically sampling, at the communications device, an amount of incoming and outgoing data transferred over a given time period;
    a network speed calculating component which calculates network speed related elements as a function of the monitored level of utilization observed by said bandwidth monitoring component, the network speed related elements including a download rate, a global speed, and a percent-free; and
    a transfer management component which manages the transfer of data over the network by calculating a block size of a set of data to transfer as a function of the network speed related elements.

10. The computer-storage media of claim 9, wherein the communications device is an interface between a client machine and the network.

11. One or more computer-storage media storing computer-usable instructions for performing a method of managing the transfer of a set of data over a network, the method comprising:
    sampling actual network utilization at various points in time during a plurality of time intervals, wherein each time interval includes a download phase in which a portion of the set of data is transferred and an idle phase in which no portion of the set of data is transferred, and wherein actual network utilization is sampled at the start of the time interval, at the end of the download phase or idle phase, and at the end of the time interval;
    calculating network speed related elements based on at least a portion of the sampled actual network utilization, the network speed related elements including a download rate, a global speed, and a percent-free, wherein the percent-free is a function of the global speed;

calculating a block size of data from the set of data to transfer in a next time interval based on the download rate;

adjusting time lengths of the download phase and the idle phase for the next time interval based on the percent-free; and facilitating transfer of the block size of data from the set of data during the download phase of the next time interval.

12. The one or more computer-storage media of claim 11, wherein calculating the block size of data comprises:

calculating an initial block size of data based on the download rate;

determining whether the initial block size of data is greater than a minimum block size boundary and less than a maximum block size boundary;

if the initial block size of data is greater than the minimum block size boundary and less than the maximum block size boundary, setting the initial block size of data as the block size of data to transfer;

if the initial block size of data is less than the minimum block size boundary, increasing the length of the next time interval to provide an adjusted block size of data that is greater than the minimum block size boundary and less than the maximum block size boundary; and if the initial block size of data is greater than the maximum block size boundary, reducing the length of the next time interval to provide an adjusted block size of data that is less than the maximum block size boundary and greater than the minimum block size boundary.

13. The one or more computer-storage media of claim 11, wherein a client receives the set of data over the network from a server.

14. The one or more computer-storage media of claim 13, wherein sampling occurs at an interface between the client and the network.

15. The one or more computer-storage media of claim 11, further comprising repeating at least said sampling each time a portion of the set of data is transferred.

16. The one or more computer-storage media of claim 11, wherein the download rate is an average based on actual network utilization sampled from at least a portion of the plurality of time intervals.

17. The one or more computer-storage media of claim 11, wherein the global speed is an average based on actual network utilization sampled from at least a portion of the plurality of time intervals.

* * * * *